Feb. 14, 1956  J. DE MENT  2,734,632
WATER TREATING DEVICE
Filed Feb. 12, 1952
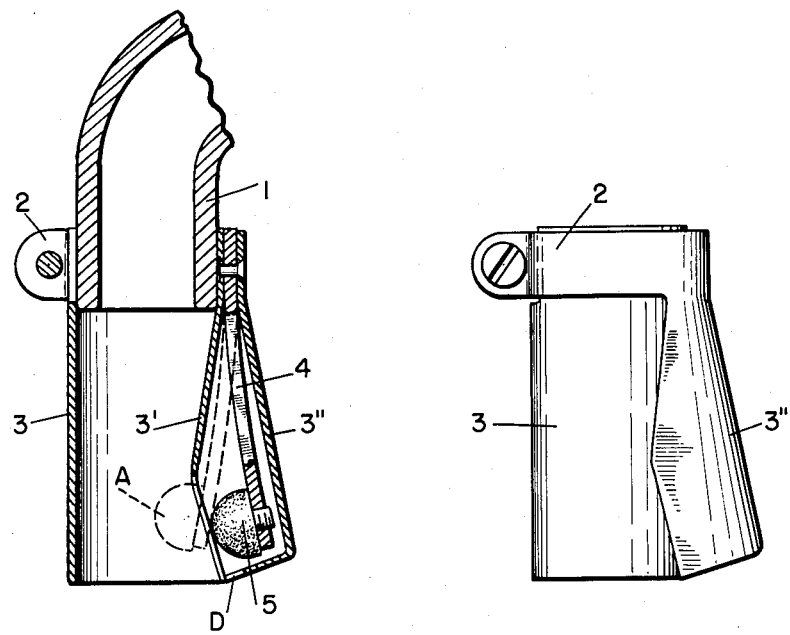
INVENTOR.
Jack De Ment United States Patent Office …

2,734,632
Patented Feb. 14, 1956

2,734,632

WATER TREATING DEVICE

Jack De Ment, Portland, Oreg.

Application February 12, 1952, Serial No. 271,139

4 Claims. (Cl. 210—36)

This invention relates to means for treating liquids borne in a conduit and subject to variations in temperature. In particular, the present improvement relates to a device for imparting certain substances to water in order to provide the water with specific and special characteristics.

Among the objects of this improvement are the following:

(a) To provide means for imparting substances to a stream of liquid which varies in temperature, and to impart these substances to the liquid uniformly or in desired concentration regardless of variations in temperature of the liquid;

(b) To provide means for treating water and other liquid borne in a conduit and subject to temperature variations wherein uniform treatment is obtained irrespective of temperature changes;

(c) To provide a device for treating potable waters with healthful additives which may otherwise be absent and not conducive to the well being of animals and of plants. For example, in adding trace amounts of iodine to iodine-deficient waters, in fluoridating waters in the prevention of tooth decay, and in mineralizing and adding trace elements to such waters as may be deficient in such respects.

Other objects are set forth subsequently.

As is well known certain potable waters may be deficient in various elements necessary to health. Iodine is an outstanding example of this; animals on an iodine-deficient diet develop thyroid dyscrasia. Boron is another example; plants do not develop properly in boron-deficient soils or when receiving water low in this element. Many other elements can be cited as necessary for the life and well-being of plants and animals.

Also, most potable waters do not carry the trace quantities of fluorine which have been found suitable in the prevention of tooth decay. Presently, the fluoride or like compounds are frequently added to the water supply of a city for this purpose. However, in many cities as well as small communities not supplied by a common water source fluoridation is pot practised. The present invention, in one modification, permits fluoridation of water at the tap or faucet. Such fluoridation is uniform irrespective of temperature changes at the faucet.

Another facet of the utility of the present improvement lies with means for treating water at the faucet, in a conduit, at the end of a hose, or upon like members with a variety of agents, so that the water is imparted with specific and special properties. For example, small amounts of weedicides and herbicides; soaps and surfactants; insecticides; chlorinating and like agents; softeners; fertilizers; special additives for industrial and process water; and the like.

Referring to the accompanying figures;

Figure 1 shows in side elevation the structure of the device for treating a liquid such as water at the end of a pipe, faucet or the like, 1; 3 is a shielding member; 4 is an element which responds to changes in liquid temperature with movement; 5 is the liquid treating agent;

Figure 2 is the same as Figure 1 except that structural details of the interior are not shown.

Disclosing the present improvement in additional detail: In Figure 1 the device is attached to the end of a pipe, faucet or like liquid conduit 1 by a band-clamp, rubber washer, threads or the like 2. The liquid which moves through the conduit 1 is received in and conveyed by the shielding or envelope member 3, the wall 3' of which carries an opening or aperture through which means 5 passes so as to be variously and gradiently exposed to the stream of liquid, as in position A.

Behind the wall 3' is an element 4 which moves with changes in temperature of the liquid; 4 is for example attached by one end to 3 or 3', as desired, having a movable free end to which is attached the body of liquid treating agent 5. Liquid which accidentally breaks from the main stream and escapes through the aperture in 3' passes through the drain D, for removal or for passage back into the main stream of liquid, as desired.

Figure 2 shows the external details of the improvement; 2 is the means for attaching the device to the conduit 1; 3 is the shielding or envelope member referred to supra; 3" is also an envelope or shielding member, preventing splashing of the liquid which may break through the aperture in 3' and also protecting the interior elements from damage.

The device can be fabricated of any suitable material, as for example of metal or plastic. Element 4 is a bimetallic strip comprising two metals with different thermal expansions attached together, the combination when heated curves toward the side of the metal with the lesser expansion. Many such combinations are known to those in the art, and a favorite one is steel and zinc, having a very low coefficient of expansion and a high one, respectively.

Figure 1 shows one simple modification of several which are practical to employ for the form and mounting and operation of the temperature sensitive element 4. In Figure 1 the bimetallic strip 4 is mounted parallel to the direction of motion of the liquid, having a free end which gradiently moves into and out of the liquid with changes in temperature. Instead of this particular arrangement, element 4 may be curved and mounted at right angles to the direction of liquid flow. Or, as desired, greater movement and increased sensitivity can be obtained by use of the De Khotinsky or the Fenwal types of thermosensitive structures, which are well known in the art and not deemed necessary of a detailed description herein.

As is evident, the geometry of the device is not limited to that of Figures 1 and 2. Also, the improvement is not limited to form or modification for the end of a faucet, pipe or like liquid conduit, and can be arranged as a section within the length of a pipe, hose or like conduit. In such form, as may be desired and according to application, the drain D carries the small amount of liquid which accidentally breaks off the main liquid stream and escapes through the aperture in wall 3', back into the main liquid stream; in this case a small tube or like conduit, not shown in the drawings, is attached by one end at D, with the other end being attached to the conduit bearing the main stream of liquid.

These particular features are optional, as is the case with the drain D, when the thermosensitive element 4 is mounted radially, i. e., secured so that it moves at right angles or in a sidewise direction into and out of the stream of liquid.

Member 5 is a body of water or liquid treating agent or means and for example may be clamped onto, bolted onto, slidably attached, or likewise arranged upon element 4. 5 may also be a loose pellet or like mass carried in a small say spherical basket attached to element 4, the basket being openable so that replacement of 5 can be made when necessary.

The character of the water treating agent 5 of course depends upon the particular application of the device. Agent 5 may be a single substance or it may be a heterogeneous composition. Thus, consolidated masses of low solubility weedicides, herbicides and insecticides can be employed in pure form; the same is true for example of agriculturally significant compounds, such as those which supply essential elements like potassium, boron and other elements to deficient soil, the proper compound being chosen; the same is also true of surfactants, foaming agents, and special chemicals used for the treatment of industrial waters. Those skilled in the art will be able to make proper and suitable choices according to the problem and utilization.

For adding very small amounts of additive to water, where the concentration is critical, as in human nutrition and disease prevention uses, agent 5 may be heterogeneous. For example, in fluoridating water in the prevention of caries where the recommended level is 1 to 1.5 parts-per-million. The compounds which can be employed and which are recognized as of value include sodium fluoride, sodium fluosilicate, hydrofluosilicic acid, and stannous fluoride, as well as others. Because these compounds do not show a low-order solubility they must be admixed with a harmless substance of low-solubility and consolidated into a coherent mass, this dissolving away at a low rate so as to provide the optimum additive level. Substances which are used in this manner as diluents include silicic acid, alkaline earth hydroxides, sulfates and like insoluble compounds, slowly dissoluble starches, plastic compositions, and the like.

What is stated supra also applies to trace minerals added to water by means of the present improvement, either for plant or animal health. In addition to the major constituents plants require small amounts of trace elements such as copper, zinc, iron, manganese, boron and molybdenum. The animal body has similar requirements, since the trace minerals, among their other vital functions, are indispensable to the enzymatic control of animal and plant physiology. Needless to add, severe deficiencies of trace minerals in soil and water produce a wide range of striking pathological conditions in plants, livestock, and man. More dangerous are the often unrecognized subclinical deficiencies, which prevent crops from attaining full productive growth, subtly restrain the growth and health of animals, and depress the general level of human health without producing well-defined disease.

An important advantage of the present improvement allows the application of a treated water to an object or surface from a distance. Thus, when the device is attached to the end of a hose or pipe, large areas of gardens and crops as well as soil can be sprayed; this also holds for those uses where windows, walls, high ceilings and the like are to be treated, as for example with a soap or wetting agent or insecticide.

I claim:
1. Means for treating a unidirectionally moving stream of liquid comprising secured to a conduit conveying said liquid an envelope member adapted to receive and convey said liquid an envelope member adapted to receive and convey the liquid, said member having an aperture in the wall thereof, a bimetal strip responsive to changes in temperature of the liquid, said strip moving with temperature changes, said strip being secured outside said envelope member by one end substantially parallel to the direction of flow of the liquid and movable at the free distal end towards and away from the stream of moving liquid, and a mass of liquid treating agent attached to the free distal end of the temperature responsive strip, said mass passing through the said aperture and into and out of the moving stream of liquid according to the temperature thereof.

2. Means for treating a unidirectionally moving stream of liquid comprising secured to a conduit conveying said liquid an envelope member adapted to receive and convey the liquid, said member having an aperture in the wall thereof, an element responsive to changes in the temperature of the liquid with movement, said element being secured outside said envelope member at said aperture by one end substantially parallel to the direction of flow of the liquid and movable at the outer free end towards and away from the stream of moving liquid, a mass of liquid treating agent attached to the free outer end of the temperature responsive element, said mass passing through the said aperture and into and out of the moving stream of liquid according to the temperature thereof, and a drainage member to receive such flowing liquid as accidentally breaks from the main moving stream thereof and escapes through the said aperture.

3. A device for treating a unidirectionally moving stream of water which comprises secured to the end of a conduit bearing the water an envelope member adapted to receive and convey said water as it emerges from the end of the conduit, said envelope member having an aperture in the wall thereof, a bimetal strip responsive to temperature changes in the water, said strip being secured by one end substantially parallel to the direction of flow of the water and movable at the outer free end towards and away from the said stream of water, said strip being mounted in juxtaposition with said aperture, a mass of water treating agent attached to the free end of the said strip, said mass passing through the said aperture and into and out of the moving stream of water according to the temperature thereof, and a drainage member adapted to receive such water as accidentally breaks from the main stream of water flowing in said conduit and through said envelope member and escapes through the said aperture, the drainage member enveloping the said bimetal strip and attached mass of water treating agent.

4. A device for treating a unidirectionally moving stream of water which comprises attached to the end of a conduit bearing and discharging the water a secondary conduit member having an aperture in the wall thereof, a bimetal strip mounted on the outside of said secondary conduit member substantially parallel with the direction of movement of the said water, said strip being secured by one end above said aperture and having a free movable end juxtaposed opposite said aperture, a mass of water treating solid attached to said free movable end, said mass being smaller than the said aperture and adapted to move through the aperture, whereby said mass moves into and out of the stream of water according to variations in temperature thereof, and a shield member around said bimetal strip and attached mass, said shield member being open at the discharge end of said secondary conduit, whereby such water as accidentally breaks through the said aperture from the main stream of water is caught and deflected back into said main stream.

References Cited in the file of this patent

UNITED STATES PATENTS

| Number | Name | Date |
|---|---|---|
| 656,510 | Burger | Aug. 21, 1900 |
| 670,333 | Simonini | Mar. 19, 1901 |
| 723,331 | Storrs | Mar. 24, 1903 |
| 933,431 | Grix | Sept. 7, 1909 |
| 1,250,089 | Campbell | Dec. 11, 1917 |
| 1,676,905 | King | July 10, 1928 |
| 2,455,240 | Dupler | Nov. 30, 1948 |